US012767340B2

(12) United States Patent
Berjot et al.

(10) Patent No.: US 12,767,340 B2
(45) Date of Patent: Oct. 20, 2026

(54) AIRCRAFT PROPULSION ASSEMBLY HAVING AN ENGINE, A PYLON AND MEANS FOR ATTACHING THE ENGINE TO THE PYLON

(71) Applicant: Airbus Operations SAS, Toulouse (FR)

(72) Inventors: Michael Berjot, Toulouse (FR); Rémi Lansiaux, Toulouse (FR); Jean-Baptiste Vignes, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 18/976,784

(22) Filed: Dec. 11, 2024

(65) Prior Publication Data

US 2025/0197017 A1 Jun. 19, 2025

(30) Foreign Application Priority Data

Dec. 14, 2023 (FR) ...................................... 2314159

(51) Int. Cl.
*B64D 27/40* (2024.01)

(52) U.S. Cl.
CPC .................................. *B64D 27/404* (2024.01)

(58) Field of Classification Search
CPC ... B64D 27/402; B64D 27/404; B64D 27/406
See application file for complete search history.

(56) References Cited

U.S. PATENT DOCUMENTS 4,065,077 A 12/1977 Brooks
5,474,258 A * 12/1995 Taylor .................. B64D 27/404 60/797
5,871,175 A * 2/1999 Demouzon .......... B64D 27/404 60/797
5,871,176 A * 2/1999 Demouzon .......... B64D 27/406 60/797
5,871,177 A * 2/1999 Demouzon .......... B64D 27/406 60/797
(Continued)

FOREIGN PATENT DOCUMENTS

CN 108263621 A 7/2018
EP 3757012 A1 * 12/2020 ........... B64D 27/406
(Continued)

OTHER PUBLICATIONS

French Search Report and Written Opinion for corresponding French Patent Application No. 2314159 dated Jun. 24, 2024.

*Primary Examiner* — Joseph W Sanderson
(74) *Attorney, Agent, or Firm* — Greer, Burns & Crain, Ltd.

(57) ABSTRACT

An aircraft propulsion assembly has an engine casing, an attachment pylon, a first front engine attachment with a pin and a blade fitted on the pin and fastened in an articulated manner on either side of a median plane to the casing and a second front engine attachment with a central rod in the median plane fastened in an articulated manner to a lower wall of the attachment pylon and to a fitting of the casing. The central rod is generally parallel to a longitudinal axis. In this arrangement, the casing is brought closer to the attachment pylon for a saving in terms of height.

9 Claims, 4 Drawing Sheets

(56) References Cited

U.S. PATENT DOCUMENTS

| | | | | |
|---|---|---|---|---|
| 7,063,290 | B2 * | 6/2006 | Marche | B64D 27/402 248/556 |
| 7,438,262 | B2 * | 10/2008 | Chamberlain | B64D 27/404 244/54 |
| 7,624,945 | B2 * | 12/2009 | Diochon | B64D 27/402 60/797 |
| 7,770,840 | B2 * | 8/2010 | Diochon | B64D 27/402 244/54 |
| 8,336,812 | B2 * | 12/2012 | Beaufort | B64D 27/406 60/797 |
| 8,561,942 | B2 * | 10/2013 | Zheng | B64D 27/406 244/54 |
| 8,800,916 | B2 * | 8/2014 | Marche | B64D 27/406 244/54 |
| 8,985,509 | B2 * | 3/2015 | Sandy | B64D 27/406 60/797 |
| 9,217,337 | B2 * | 12/2015 | Sandy | F02C 7/20 |
| 10,295,970 | B2 * | 5/2019 | Iliopoulos | B64F 5/10 |
| 10,829,233 | B2 * | 11/2020 | Brochard | B64D 27/406 |
| 11,970,280 | B2 * | 4/2024 | Glemarec | F01D 25/28 |
| 12,397,920 | B2 * | 8/2025 | Czapla | B64D 27/40 |
| 12,448,137 | B2 * | 10/2025 | Deforet | F02C 7/20 |
| 12,565,321 | B2 * | 3/2026 | Berjot | B64D 27/18 |
| 2005/0269444 | A1 * | 12/2005 | Marche | B64D 27/406 244/54 |
| 2006/0231679 | A1 * | 10/2006 | Chamberlain | B64D 27/404 244/54 |
| 2007/0205323 | A1 * | 9/2007 | Lionel | B64D 27/404 244/53 R |
| 2007/0228213 | A1 * | 10/2007 | Diochon | B64D 27/402 244/54 |
| 2008/0169378 | A1 * | 7/2008 | Beaufort | B64D 27/406 60/797 |
| 2010/0206981 | A1 | 8/2010 | Baillard | |
| 2012/0286125 | A1 * | 11/2012 | Marche | B64D 27/406 248/554 |
| 2013/0200211 | A1 * | 8/2013 | Zheng | B64D 27/402 244/54 |
| 2013/0302157 | A1 * | 11/2013 | Sandy | F02C 7/20 415/213.1 |
| 2014/0061375 | A1 * | 3/2014 | Sandy | B64D 27/404 244/54 |
| 2014/0084129 | A1 | 3/2014 | Sandy | |
| 2016/0167808 | A1 * | 6/2016 | Iliopoulos | B64F 5/10 29/428 |
| 2018/0186462 | A1 | 7/2018 | Brochard | |
| 2023/0028982 | A1 * | 1/2023 | Glemarec | B64D 27/404 |
| 2024/0417085 | A1 * | 12/2024 | Deforet | B64D 27/404 |
| 2024/0417086 | A1 * | 12/2024 | Deforet | B64D 27/404 |
| 2024/0417087 | A1 * | 12/2024 | Deforet | B64D 27/402 |
| 2024/0417089 | A1 * | 12/2024 | Deforet | F02C 7/20 |
| 2024/0417090 | A1 * | 12/2024 | Czapla | B64D 27/40 |
| 2025/0002164 | A1 * | 1/2025 | Berjot | B64D 27/402 |
| 2025/0002165 | A1 * | 1/2025 | Berjot | B64D 27/18 |
| 2025/0100701 | A1 * | 3/2025 | Powell | B64D 27/402 |
| 2026/0109465 | A1 * | 4/2026 | Gueneau | B64D 27/402 |

FOREIGN PATENT DOCUMENTS

| | | | | |
|---|---|---|---|---|
| FR | 3029504 A1 * | 6/2016 | | F16C 35/02 |
| FR | 3131734 A1 | 7/2023 | | |
| GB | 2360749 A * | 10/2001 | | B64D 27/406 |

* cited by examiner

AIRCRAFT PROPULSION ASSEMBLY HAVING AN ENGINE, A PYLON AND MEANS FOR ATTACHING THE ENGINE TO THE PYLON

CROSS-REFERENCE TO RELATED APPLICATIONS

This application claims the benefit of French Patent Application Number 2314159 filed on Dec. 14, 2023, the entire disclosure of which is incorporated herein by way of reference.

FIELD OF THE INVENTION

The present invention relates to the general field of attaching an engine beneath the wing of an aircraft. It relates in particular to a propulsion assembly comprising an engine, for example of the turbofan type, a pylon and an attachment assembly intended to attach the engine beneath the pylon. It also relates to an aircraft equipped with such a propulsion assembly.

BACKGROUND OF THE INVENTION

An aircraft conventionally has wings and at least one propulsion assembly fastened beneath each of these wings. Each propulsion assembly comprises an attachment pylon and an engine. The attachment pylon has a rigid structure called the "primary structure" that is fastened between the wing and the engine via attachment assemblies, namely a first attachment assembly between the wing and the attachment pylon and a second attachment assembly between the pylon and the engine.

The second attachment assembly comprises a front and attachment and a rear engine attachment.

Patent application FR3113484 describes an engine assembly that has reduced vertical bulk since the front engine attachment is incorporated in the attachment pylon. Such an engine assembly that makes it possible to bring the engine closer to the wing applies in particular to fans of large dimensions, for which it is necessary to minimize the height of the front engine attachment so as to move the fan away from the ground.

Although such an engine assembly is effective, there is a need to find a propulsion assembly solution that makes it possible to further minimize the height of the engine attachment.

SUMMARY OF THE INVENTION

An object of the present invention is to propose a propulsion assembly comprising an engine, a pylon and an attachment device intended to attach the engine beneath the pylon, and that makes it possible to reduce the vertical distance between the wing and the engine.

To this end, there is proposed a propulsion assembly of an aircraft, said propulsion assembly having a longitudinal axis and having a vertical median plane passing through the longitudinal axis and having:

- an engine having a casing,
- an attachment pylon having a primary structure with a frontal wall and a lower wall,
- a first front engine attachment having a pin and a blade, wherein the pin is cylindrical with a first end as one with the frontal wall of the primary structure of the attachment pylon and a second end that projects towards the front, wherein the axis of the pin is parallel to the longitudinal axis and in the median plane, wherein the blade has a bore passing through the blade, of which the axis is parallel to the axis of the pin, wherein the bore of the blade is fitted on the pin, wherein the blade is fastened in an articulated manner on either side of the median plane to the casing via a point of connection to a front fitting as one with the casing, and
- a second front engine attachment having a central rod disposed in the median plane, wherein a first end of the central rod is fastened in an articulated manner to a first fitting as one with the lower wall of the primary structure, and wherein a second end of the central rod is fastened in an articulated manner to a second fitting as one with the casing, wherein the central rod is generally parallel to the longitudinal axis.

With such an arrangement, the casing is brought closer to the attachment pylon for a saving in terms of height.

Advantageously, for each connection point, the propulsion assembly has an additional fastening point between the blade and the front fitting, wherein each additional fastening point is a backup safety point.

Advantageously, the first end of the central rod is behind the second end of the central rod.

Advantageously, each connection point ensures a ball joint connection of which a main rotation axis is parallel to the longitudinal axis, and wherein the rotations about the two other axes are of reduced amplitude.

Advantageously, the articulation of the first end of the central rod to the first fitting and the articulation of the second end of the central rod to the second fitting take the form of pivot connections of which the axes are perpendicular to the median plane.

Advantageously, the second front engine attachment has two lateral rods disposed on either side of the median plane, a first end of each lateral rod is fastened in an articulated manner to the first fitting and a second end of each lateral rod is fastened in an articulated manner to the second fitting.

Advantageously, the blade is made up of two sub-blades that adjoin one another.

Advantageously, the primary structure is made up of two parts that adjoin one another along the median plane, the pin is made up of two half-pins, wherein each one takes the form of a half-cylinder, and each half-pin has a first end as one with a part of the primary structure and a second end that projects towards the front.

The invention also proposes an aircraft having a wing and a propulsion assembly according to one of the preceding variants, of which the primary structure is fastened beneath the wing.

BRIEF DESCRIPTION OF THE DRAWINGS

The abovementioned features of the invention, along with others, will become more clearly apparent upon reading the following description of one exemplary embodiment, said description being given with reference to the appended drawings, in which.

DETAILED DESCRIPTION OF THE PREFERRED EMBODIMENTS

Figure 1:
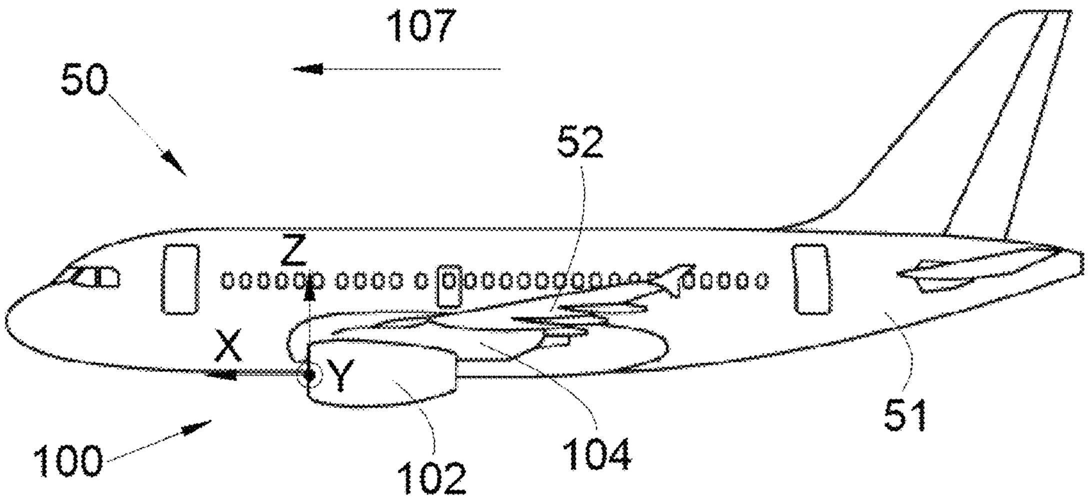
FIG. 1 shows a side view of an aircraft according to the invention.

With reference to FIG. 1, an aircraft 50 comprises a fuselage 51 to which is fastened, on each side, a wing 52 beneath which is mounted at least one propulsion assembly 100 according to the invention.

The propulsion assembly 100 comprises an attachment pylon 104 fastened beneath the wing 52 and an engine 102 fastened to the attachment pylon 104 by means of an attachment assembly 180.

By convention, X denotes the longitudinal axis of the engine 102 and therefore of the propulsion assembly 100, this longitudinal axis X being parallel to a longitudinal direction of this engine 102. Moreover, Y denotes the transverse axis of the engine 102, which is horizontal when the aircraft is on the ground, and Z denotes the vertical axis or vertical height when the aircraft is on the ground, these three directions X, Y and Z being mutually orthogonal.

Moreover, the terms "front" and "rear" are to be considered relative to a direction of forward movement of the aircraft 50 when the engine 102 is in operation, this direction being schematically shown by the arrow 107 in the figures.

Figure 2:
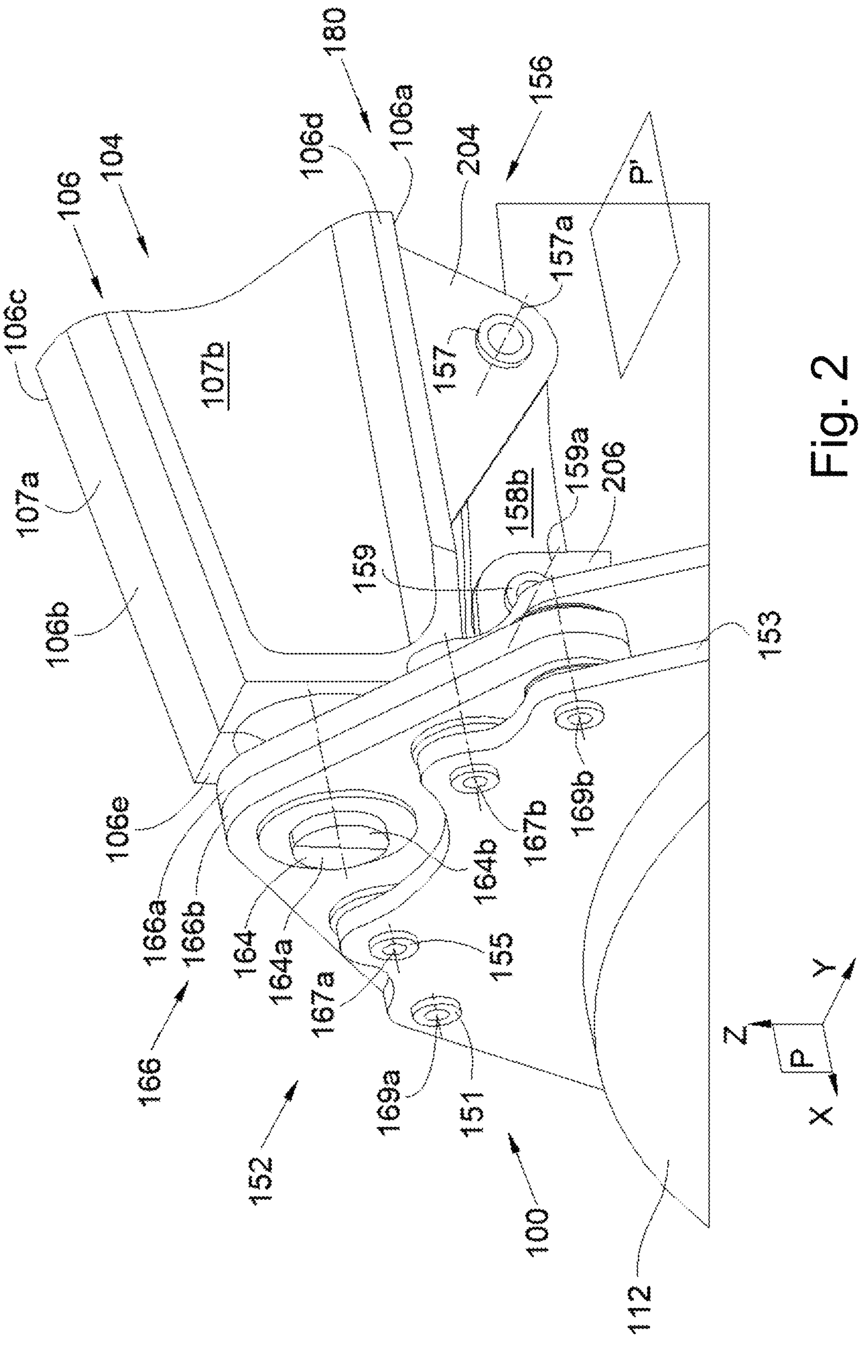
FIG. 2 is a perspective view of a propulsion assembly according to the invention.
Figure 3:
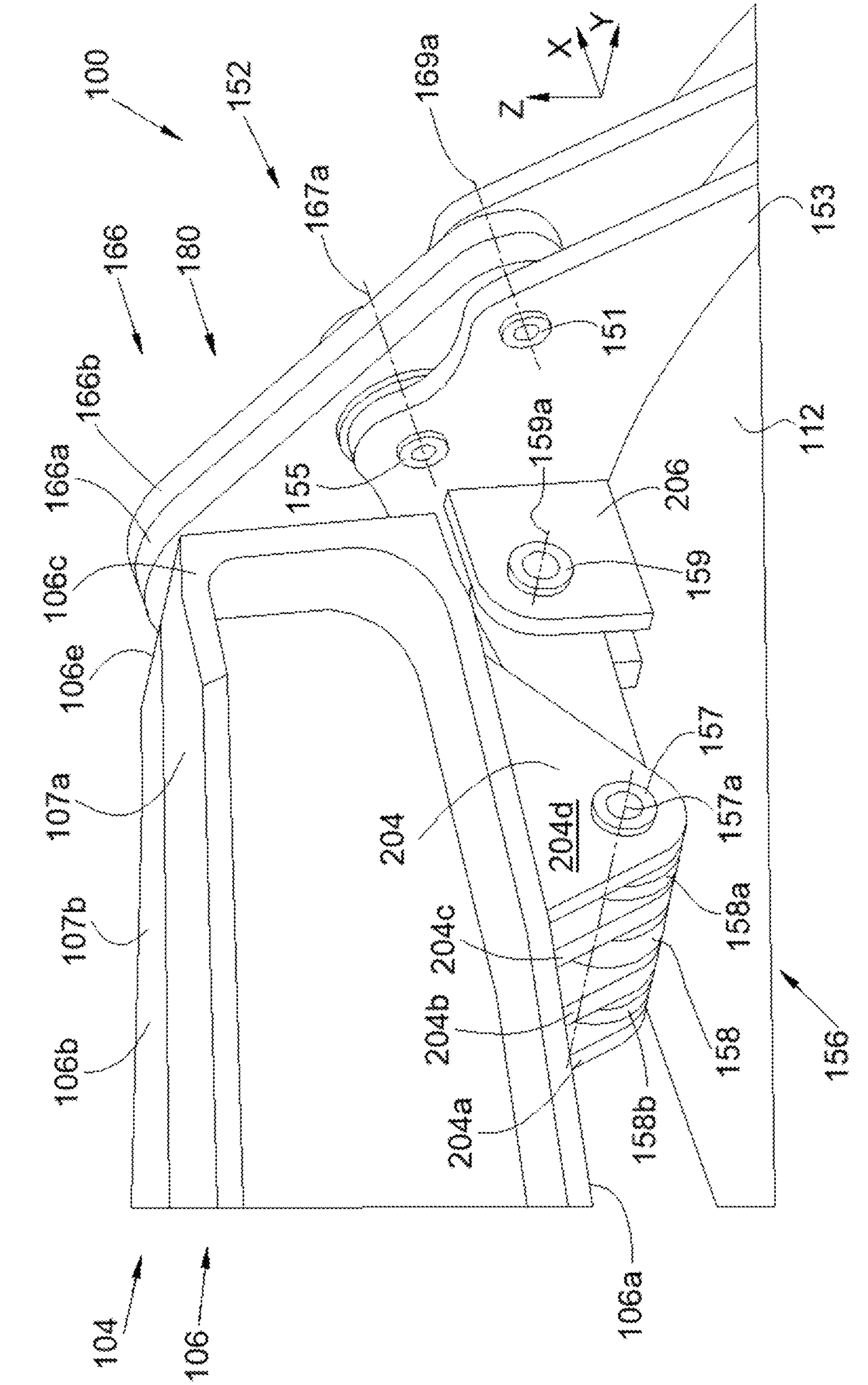
FIG. 3 is a perspective view of the propulsion assembly in FIG. 2.

The attachment pylon 104 is, in FIGS. 2 and 3, shown by its primary structure 106 extending in the longitudinal direction X between a front end and a rear end, between which there is a median zone. The primary structure 106 is fastened beneath the wing 52.

In the embodiment of the invention that is presented here, the primary structure 106 takes the form of a beam that has a lower wall 106*a*, upper wall 106*b*, two lateral walls 106*c-d* and a frontal wall 106*e* oriented towards the front.

The engine 102 has a casing 112 of cylindrical shape about the longitudinal axis X that surrounds the elements of the core of the engine.

The attachment pylon 104 is generally symmetrical with respect to a vertical median plane XZ of the engine 102 that passes through the longitudinal axis X, which is referred to below as median plane P and separates the attachment pylon 104 into two parts, port-side and starboard-side.

The attachment assembly 180 may comprise, at the rear of the attachment pylon 104, a rear engine attachment and also a device for reacting thrust forces of the engine. The rear engine attachment is not shown in the figures; it can be of any type known to those skilled in the art and will not be described further.

According to the invention, and with reference to FIGS. 2 and 3, the attachment assembly 180 comprises, in front of the attachment pylon 104, a front engine attachment assembly that comprises a first front engine attachment 152 connecting the engine 102 to the frontal wall 106*e* of the attachment pylon 104 and a second front engine attachment 156 connecting the lower wall 106*a* of the attachment pylon 104 to the engine 102.

The first front engine attachment 152 is interposed directly between the frontal wall 106*e* of the attachment pylon 104 and the casing 112 via a front fitting 153 as one with the casing 112, and more particularly with an upper part of the casing 112. In the embodiment of the invention that is presented in FIG. 2 and FIG. 3, there is a front fitting 153 that extends on either side of the median plane P, but this front fitting 153 may be divided into two distinct front sub-fittings disposed on either side of the median plane P.

The first front engine attachment 152 has a pin 164, also called a "spigot", that is cylindrical and has a first end as one with the frontal wall 106*e* and a second end that projects towards the front. The axis of the pin 164 is in the median plane P and parallel to the longitudinal axis X.

The first front engine attachment 152 also has a blade 166. In the embodiment of the invention that is presented here, the blade 166 is made up of two sub-blades 166*a-b* that adjoin one another, one behind the other along the longitudinal axis X with a rear blade 166*a* and a front blade 166*b*, this being for reasons of safety and of doubling the force paths in order to ensure that the connection is maintained even in the event of damage and loss of one of the connecting elements. The technical features that are described here for the blade 166 apply, depending on the case, to each sub-blade 166*a-b*.

The blade 166, and therefore in this case each sub-blade 166*a-b*, has a through-bore of which the axis is parallel to the axis of the pin 164 in the position of use of the first front engine attachment 152, i.e., when the first front engine attachment 152 is fastened to the attachment pylon 104 and to the engine 102 and is operational so as to react the forces of the engine 102. The bore of the blade 166 and therefore each sub-blade 166*a-b* is fitted on the pin 164 ensuring that the blade 166 is free to rotate on the pin 164 about the axis of the pin, and also about the transverse axis Y and about the vertical axis Z, the connection between the pin 164 and the bore of the blade 166 being a ball joint connection.

The blade 166 is, furthermore, fastened in an articulated manner to the front fitting 153, i.e. the blade 166 is fastened in an articulated manner on either side of the median plane P to the casing 112 via two points 167*a-b* of connection to the front fitting 153 that are distributed on the port side and on the starboard side of the median plane P. There is thus one connection point 167*a* on the starboard side of the median plane P and one connection point 167*b* on the port side of the median plane P.

In the embodiment of the invention that is presented here, each point 167*a-b* of connection of the blade 166 to the front fitting 153 is made up of a female clevis created in the front fitting 153, a male clevis created by the blade 166 (in this case the sub-blades 166*a-b*), and a frontal shear shaft 155 that is parallel to the longitudinal axis X and passes through the female clevis and fits in the male clevis via a ball joint connection. For example, the frontal shear shaft 155 is equipped with a boss on which the male clevis is mounted in an articulated manner so as to create the ball joint connection, thus each connection point 167*a-b* ensures a ball joint connection of which a main rotation axis is parallel to the longitudinal axis X, and wherein the rotations about the two other axes are of reduced amplitude.

The pin 164 makes it possible to react the forces in the Y and Z directions in a frontal plane perpendicular to the longitudinal direction X.

The front fittings 153, the blade 166 and the pin 164 define a primary force path.

The second front engine attachment 156 is interposed directly between the median zone of the primary structure 106, in this case the lower wall 106*a*, and the casing 112, and more particularly an upper part of the casing 112. The second front engine attachment 156 comprises a first fitting 204 as one with the lower wall 106*a* of the primary structure 106 and a second fitting 206 as one with the casing 112.

The second front engine attachment 156 has a central rod 158 that is in the median plane P, wherein a first end of the central rod 158 is fastened in an articulated manner to the first fitting 204, and wherein a second end of the central rod 158 is fastened in an articulated manner to the second fitting 206.

The central rod 158 is generally parallel to the longitudinal axis X, i.e., the point of articulation of the first end to the first fitting 204 and the point of articulation of the second end to the second fitting 206 are generally in the same plane perpendicular to the median plane P.

In the embodiment of the invention that is presented here, each point of articulation of the central rod 158 to the first fitting 204 and to the second fitting 206 is a pivot connection about rotation axes 157*a* and 159*a* that are perpendicular to the median plane P.

In the embodiment of the invention that is presented here, each articulation point of the central rod 158 is made up of a female clevis created respectively in the first fitting 204 and the second fitting 206, a male clevis created by the central rod 158, and respectively a rear shear shaft 157 and a front shear shaft 159 that are perpendicular to the median plane P, and wherein each one passes through the female clevis and fits in the corresponding male clevis so as to form the pivot connection about the rotation axis 157*a*, 159*a* under consideration.

The central rod 158 makes it possible to react the forces along the longitudinal axis X. In this case, each shear shaft 157, 159 is a double shaft, i.e. with an inner shaft inserted in an outer shaft so as to compensate for a possible failure of the outer shaft.

The rotation axes 157*a* and 159*a* are mutually parallel and perpendicular to the median plane P and they are inscribed in a rear plane P' that is perpendicular to the plane P and generally parallel to the longitudinal axis X.

With such an arrangement, the casing 112 may be brought closer to the attachment pylon 104 for a saving in terms of height.

In the embodiment of the invention that is presented here, the first end of the central rod 158 is behind the second end of the central rod 158.

For safety reasons, for each connection point 167*a-b*, the propulsion assembly 100 has an additional fastening point 169*a-b* between the blade 166 and the front fitting 153. The two additional fastening points 169*a-b* are disposed on either side of the median plane P and in this case on the outside of the connection points 167*a-b*.

Each additional fastening point 169*a-b* forms, between the blade 166 and the front fitting, a pivot connection about a rotation axis parallel to the longitudinal axis X, wherein the front fitting 153 forms the female clevis in which is inserted the blade 166 forming the male clevis, and wherein an additional shear shaft 151 parallel to the longitudinal axis X passes through the female clevis and fits in the male clevis.

Each additional fastening point 169*a-b* is a backup safety point that is activated only in the event of one of the connection elements breaking. This is realized for example such that each additional shear shaft 151 is mounted without clearance in the female clevis and with clearance in the male clevis. Thus, in normal operation of the attachment assembly 180, there is neither contact between the additional shear shaft 151 and the male clevis nor force transfer through the additional fastening points 169*a-b*, and in degraded operation, the front fitting 153 and/or the blade 166 may move so as to bring at least one of the additional shear shafts 151 of the additional fastening points 169*a-b* against the male clevis so as to transfer forces.

In the embodiment of the invention that is presented here, the second front engine attachment 156 has two lateral rods 158*a-b* disposed on either side of the median plane P and in this case on either side of the central rod 158.

For each lateral rod 158*a-b*, a first end of said lateral rod 158*a-b* is fastened in an articulated manner to the first fitting 204 and a second end of said lateral rod 158*a-b* is fastened in an articulated manner to the second fitting 206. According to a first configuration, the fastening of the lateral rod 158*a-b* to the second fitting 206 is a backup safety point. According to a second configuration, the lateral rod 158*a-b* is mounted in the second fitting 206 without clearance.

The articulation points of the first end of each lateral rod 158*a-b* and of the first end of the central rod 158 are coincident and each ensure a pivot connection about the same rotation axis 157*a* and the articulation points of the second end of each lateral rod 158*a-b* and of the second end of the central rod 158 are coincident and each ensure a pivot connection about the same rotation axis 159*a*.

Figure 4:
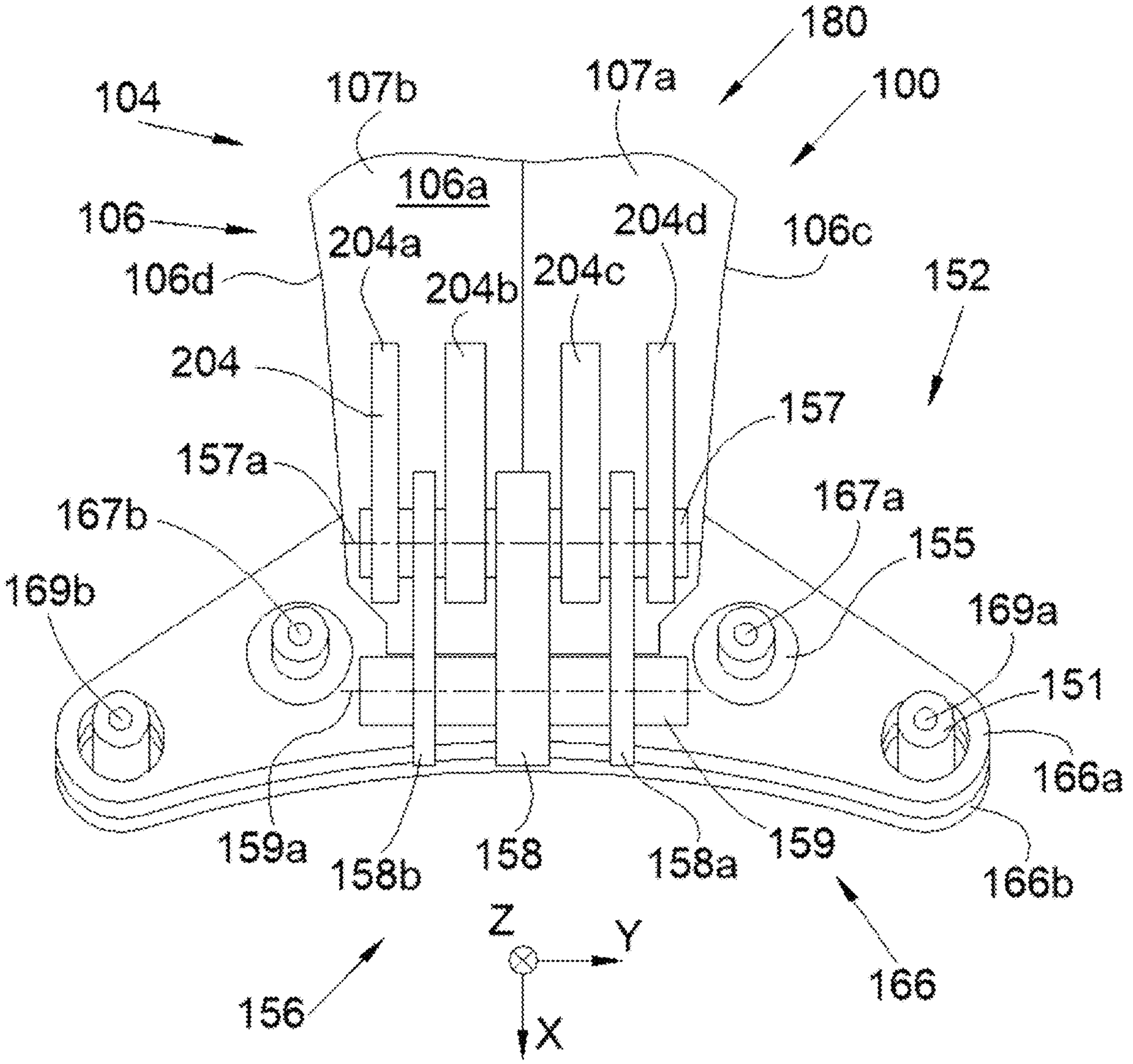
FIG. 4 is a view from below of the propulsion assembly according to the invention, in which the engine is not shown.

As can be better seen in FIGS. 3 and 4, the first fitting 204 is made up of four parallel walls 204*a-d* as one with the lower wall 106*a*. The four walls 204*a-d* are distant from one another and, between two successive walls 204*a-d*, a lateral rod 158*a-b* or the central rod 158 is inserted.

The second fitting 206 has the same structure with four parallel walls as one with the casing 112, wherein the rods 158 and 158*a-b* are interposed between two successive walls.

The shear rods 157 and 159 pass through the various rods 158 and 158*a-b* and the walls in question.

In the embodiment of the invention that is presented here, the primary structure 106 is made up of two parts 107*a-b* that adjoin one another along the median plane P, and this makes it possible to ensure force transfer even if one of the two parts 107*a-b* is defective.

At the same time, the pin 164 is made up of two half-pins 164*a-b*, wherein each one takes the form of a half-cylinder, and each half-pin 164*a-b* has a first end as one with a part 107*a-b* of the primary structure 106 and a second end that projects towards the front.

The two half-cylinders adjoin one another and are disposed against one another so as to form the pin 164.

Putting the two half-pins 164*a-b* in place makes it possible to ensure a force path even in the event of one of the half-pins 164*a-b* breaking.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A propulsion assembly of an aircraft, said propulsion assembly having a longitudinal axis and having a vertical median plane passing through the longitudinal axis, the propulsion assembly comprising:

an engine having a casing;

an attachment pylon having a primary structure, the primary structure having a frontal wall and a lower wall;

a first front engine attachment having a pin and a blade, wherein the pin is cylindrical with a first end integral with the frontal wall of the primary structure of the attachment pylon and a second end that projects towards the front, wherein the axis of the pin is parallel to the longitudinal axis and in the median plane, wherein the blade has a bore passing through the blade, of which the axis is parallel to the axis of the pin, wherein the bore of the blade is fitted on the pin, wherein the blade is fastened in an articulated manner on either side of the median plane to the casing via a point of connection to a front fitting integral with the casing; and a second front engine attachment having a central rod disposed in the median plane, wherein a first end of the central rod is fastened in an articulated manner to a first fitting integral with the lower wall of the primary structure, and wherein a second end of the central rod is fastened in an articulated manner to a second fitting integral with the casing, wherein the central rod is generally parallel to the longitudinal axis.

2. The propulsion assembly according to claim 1, wherein, for each connection point, the propulsion assembly has an additional fastening point between the blade and the front fitting, wherein each additional fastening point is a backup safety point.

3. The propulsion assembly according to claim 1, wherein the first end of the central rod is behind the second end of the central rod.

4. The propulsion assembly according to claim 1, wherein each connection point is a ball joint connection of which a main rotation axis is parallel to the longitudinal axis, and wherein the rotations about the two other axes are of reduced amplitude.

5. The propulsion assembly according to claim 1, wherein the articulation of the first end of the central rod to the first fitting and the articulation of the second end of the central rod to the second fitting take the form of pivot connections of which the axes are perpendicular to the median plane.

6. The propulsion assembly according to claim 5, wherein the second front engine attachment has two lateral rods disposed on either side of the median plane, in that a first end of each lateral rod is fastened in an articulated manner to the first fitting and in that a second end of each lateral rod is fastened in an articulated manner to the second fitting.

7. The propulsion assembly according to claim 1, wherein the blade is made up of two sub-blades that adjoin one another.

8. The propulsion assembly according to claim 1, wherein the primary structure is made up of two parts that adjoin one another along the median plane, in that the pin is made up of two half-pins, wherein each one takes the form of a half-cylinder, and in that each half-pin has a first end integral with a part of the primary structure and a second end that projects towards the front.

9. An aircraft having a wing and a propulsion assembly according to claim 1, of which the primary structure is fastened beneath the wing.

* * * * *